3,010,848
METHOD OF CONDITIONING GLASS FIBRE
Paul Rochas, Saint-Cyr-au-Mont d'Or (Rhône), and Maurice Coupez, Lyon (Rhône), France, assignors to Institut Textile de France, Paris, France
No Drawing. Filed Feb. 27, 1959, Ser. No. 795,903
Claims priority, application France Feb. 28, 1958
9 Claims. (Cl. 117—126)

This invention relates to an improved treatment of glass fiber that is to be incorporated in plastics, e.g. plastic laminates.

One type of product embodying glass fiber and in connection with which the process of the invention is of especial value comprises the reinforced plastic laminates that include a glass fiber carrier imbedded in a synthetic resin of the polyester or the epoxy type. The glass carrier or reinforcement may be provided in the form of loose, spun or woven fiber. This fiber, to be suitable for use in products of this and similar types, should be thoroughly free of the oil coating applied thereto during spinning and similar textile operations. Glass fiber material prior to use in the above-mentioned plastic laminates has to be coated with a film of size the purpose of which is to improve the bond between the glass textile carrier or reinforcement and the surrounding synthetic resin. The provision of such a bonding film is especially important in cases where the final product is to be used in watery conditions to prevent de-lamination. To provide this bond various sizing compositions based on complex acryl-chrome compounds as well as chlorinated silicone compositions have been used, and the results have generally been satisfactory provided the glass fiber material was first thoroughly de-oiled as indicated above. Otherwise such sizes or binders are practically ineffective. A similar requirement arises in other analogous cases, as where a layer of adhesive resinous composition comprising an epoxy or epoxy ester together with its setting agent is to be applied to a web or carrier comprising glass fiber. If a good firm bond is to be obtained between the resin layer and the underlying glass fiber the latter has to be thoroughly de-oiled beforehand.

Glass fiber can be de-oiled by various means, including chemical treatments and heating, but such methods have heretofore resulted in a substantial reduction in the characteristics of the glass fiber, especially its mechanical toughness.

It is an object of this invention to eliminate entirely the requirement of de-oiling glass fiber stock in the production of composite products of the general type specified above. The elimination of the de-oiling step brings with it evident economic advantages as well as improving the characteristics of the final product.

The applicants have discovered that provided certain conditions to be specified hereinafter are observed, epoxy compounds become usable as size compositions for improving the bond of glass fiber with the surrounding compounds, even though the fiber is coated with the usual oil film as is normally the case. It has further been found that such epoxy compounds are capable of combining with the oily coatings normally applied to glass fiber to constitute therewith a tough bonding medium greatly increasing adhesion between the fiber and the resinous compounds subsequently molded or otherwise formed around the glass fiber carrier.

While these results were not predictable on the basis of conventional teachings as the alleged incompatibility between epoxy resins and oiled glass fiber and in fact appear to stand in flat contradiction with such teachings, it is emphasized that such prior-art teachings remain broadly true, and that the unexpected results stated above are only attainable provided certain operating conditions are followed which depart substantially from the conventional steps used in applying such epoxy compounds as coatings, adhesive layers, and the like to glass fibre.

The basic requirements according to the invention are the following:

(1) The epoxy compound should be used either in pure form or in the presence of only a small relative proportion of a slow-setting agent such as a polyamine or a polyamide, the proportion of setting agent not exceeding about 5% by weight of the epoxy compound present. This is in contrast with the practice in all conventional processes involving the use of epoxy resins, where the latter are used in admixture with high proportions of a hardening or setting agent adapted to react with the internal ether-oxide functions in the epoxy compound.

(2) The proportion of epoxy compound applied to the oiled glass fiber material should be approximately the same, in order of magnitude, as the proportion of oiling composition present capable of reacting with the internal ether-oxide functions of the epoxy compound, i.e. approximately from 0.5 to 1.5% by weight of the glass fiber.

(3) The epoxy compound should be used in a highly dilute state, say on the order of a few grams per liter, in a solution or dispersion within an organic liquid representing a good solvent for fatty compounds.

The following explanations can be given of the unexpected compatibility that is shown by epoxy compounds, when applied in accordance with the conditions just specified, with oiled glass fiber.

The solvent acts to swell the oil layer, disperses a major part of its constituents and wets the glass fiber.

Moreover the epoxy compound, applied in a very low concentration, reacts with certain constituents of the oiling composition, such as esters, polyalcohols, organic sulfonates and the like, present in a comparably low concentration on the fibre. These constituents of the oiling composition act as hardeners or setting agents for the epoxy compound, forming a stable resin in combination therewith. It will be evident that such a reaction cannot occur if the epoxy compound, in admixture with a substantial proportion of hardener agent, were to be applied in a high concentration to the fiber, as would be the case with epoxy-base adhesive compositions and the like, the incompatibility of which with oiled glass fiber material can be readily observed experimentally.

Furthermore, the epoxy compound partly set by reaction with the oil constituents, nevertheless retains some residual reactivity as a result of which it is subsenquently able, during the assembly of the laminate or similar final product, to bond to the polyester resin surrounding the glass fiber.

The process of the invention makes possible the manufacture of reinforced plastic laminates and similar composites having higher mechanical and also electrical characteristics than similar articles produced by conventional methods using de-oiled and sized glass fiber materials. Electrically the conductivity and dielectric losses are not increased when the product has been dipped 48 hours in water. Resistance of the laminate to de-lamination and impact also remain remarkably high after protracted immersion in water.

The epoxy compounds herein referred to are the synthetic compounds containing in their molecule at least one epoxy-1,2-group and especially the reaction products of epichlorhydrine with polyalcohols and/or polyphenols. Also included in the definition according to the invention are modified epoxy compounds resulting from a partial combination of the internal ether-oxides thereof with fatty esters and/or esters.

The glass fiber material used according to the invention may assume various forms wherein the fiber may be of short or long length, and may be in loose form or spun into yarn or drawn into continuous filaments or wire as well of course as any textiles produced from such fiber yarn and filaments by weaving, matting, knitting and similar textile processes.

The oil coatings referred to herein as applied to the glass fiber material may comprise any of the fatty and/or viscous compounds that are applied to the glass fiber during various stages of its manufacture, such as the spinning of cut fiber, and/or reeling operations, conditioning prior to weaving, and during the actual weaving step.

A fuller understanding of the invention will be apparent from the following flow diagram:

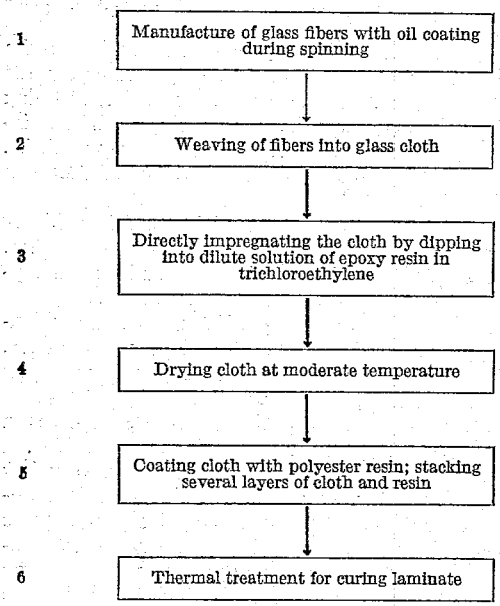

*Example 1*

A satin material as put out from the weaving frame and not de-oiled, with both weft and woof comprising yarn made from continuous textile glass fiber, is treated by immersion in a bath containing the following solution:

Trichlorethylene _____ cc__ 95
Toluene _____ cc__ 4
Methylethylketone _____ cc__ 1
4,4'-dihydroxydiphenyl - dimethylmethane-epichlor-
  hydrine epoxide _____ gram__ 1
Polyamid-type setting agent comprising adipic acid,
  glycol and ammonia _____ gram__ 0.04

The fabric is then dried at 40° C. to evaporate the solvent. The fabric is allowed to stand a few days at ordinary temperature and is then used in the production of a polyester-base laminated plastic product.

*Example 2*

A taffeta fabric comprising weft and woof yarn of continuous textile glass fiber, oiled in the usual way, is fulled in a solution comprising:

Perchlorethane _____ cc__ 95
Diacetone-alcohol _____ cc__ 1
Xylene _____ cc__ 4
4,4' dihydroxydiphenyl 2,2 propane epichlorhydrine
  epoxide _____ g__ 1

The fabric is dried at 50° C. to evaporate the solvent and is then fulled again in the same solution as above and again dried at 50° C. The resulting fabric can be used in the manufacture of reinforced and laminate plastic products of the types based on polyesters, epoxy casting resins and setting agent, and silicone resins.

The examples are not, of course, to be interpreted as restricting the scope of the invention.

What we claim is:

1. The method of processing glass fiber material having an oil film coating the fiber, which method comprises applying to the oiled glass fiber a liquid composition comprising an organic oil-dissolving solvent containing a small amount of an epoxide of 4,4'-dihydroxy-diphenyl-2,2-dialkane-epichlorhydrine, the amount of said epoxide being approximately 0.5–1.5 percent by weight of the glass fiber, and then allowing the solvent to evaporate.

2. The method of claim 1, wherein the epoxy compound has admixed to it a setting agent in a proportion not higher than about 5% by weight of the epoxy compound.

3. The method of claim 1, wherein the epoxy compound is dispersed in the organic liquid solvent.

4. Process according to claim 1, wherein the solvent is evaporated at a temperature of approximately 40–50° C.

5. Process according to claim 1, wherein the epoxide compound of the liquid composition is 4,4-dihydroxy-diphenyl-dimethylmethane-epichlorhydrine epoxide.

6. Process according to claim 1, wherein the liquid composition has the approximate composition of Trichlorethylene _____ cc__ 95
Toluene _____ cc__ 4
Methylethylketone _____ cc__ 1
4,4'-dihydroxydiphenyl - dimethylmethane-epichlor-
  hydrine epoxide _____ gram__ 1
Polyamide-type setting agent comprising adipic acid,
  glycol and ammonia _____ gram__ 0.04

7. Process according to claim 1, wherein the liquid composition has the approximate composition of Perchlorethane _____ cc__ 95
Diacetone alcohol _____ cc__ 1
Xylene _____ cc__ 4
4,4'-dihydroxydiphenyl - 2,2-propane-epichlorhydrine
  epoxide _____ gram__ 1

8. In a method of producing a composite reinforced plastic product, the step of applying to oiled glass fiber material a liquid composition comprising an organic oil-dissolving solvent containing a small amount of an epoxide of 4,4'-dihydroxy-diphenyl-2,2-dialkane-epichlorhydrine, the amount of said epoxide being approximately 0.5–1.5 percent by weight of the glass fiber, allowing the epoxy compound to react with constituents of the oil coating the fiber and the solvent to evaporate thereby to form a binder with the fiber, and coating the thus treated glass fiber material with plastic resin to be bonded to the glass fiber through said binder.

9. The method of claim 8, wherein said composition further contains a setting agent in a proportion not higher than about 5% by weight of the epoxy compound.

References Cited in the file of this patent

UNITED STATES PATENTS

| | | |
|---|---|---|
| 2,530,983 | Minter | Nov. 21, 1950 |
| 2,541,027 | Bradley | Feb. 13, 1951 |
| 2,694,655 | Pullman et al. | Nov. 16, 1954 |
| 2,714,276 | Sandes | Aug. 2, 1955 |
| 2,768,153 | Shokal | Oct. 23, 1956 |
| 2,930,106 | Wrotnowski | Mar. 29, 1960 |